Sept. 22, 1959      E. J. DIEBOLD      2,905,883
AUTOMATIC OVERLAP CONTROL FOR MECHANICAL RECTIFIERS
Filed March 15, 1955      3 Sheets-Sheet 1
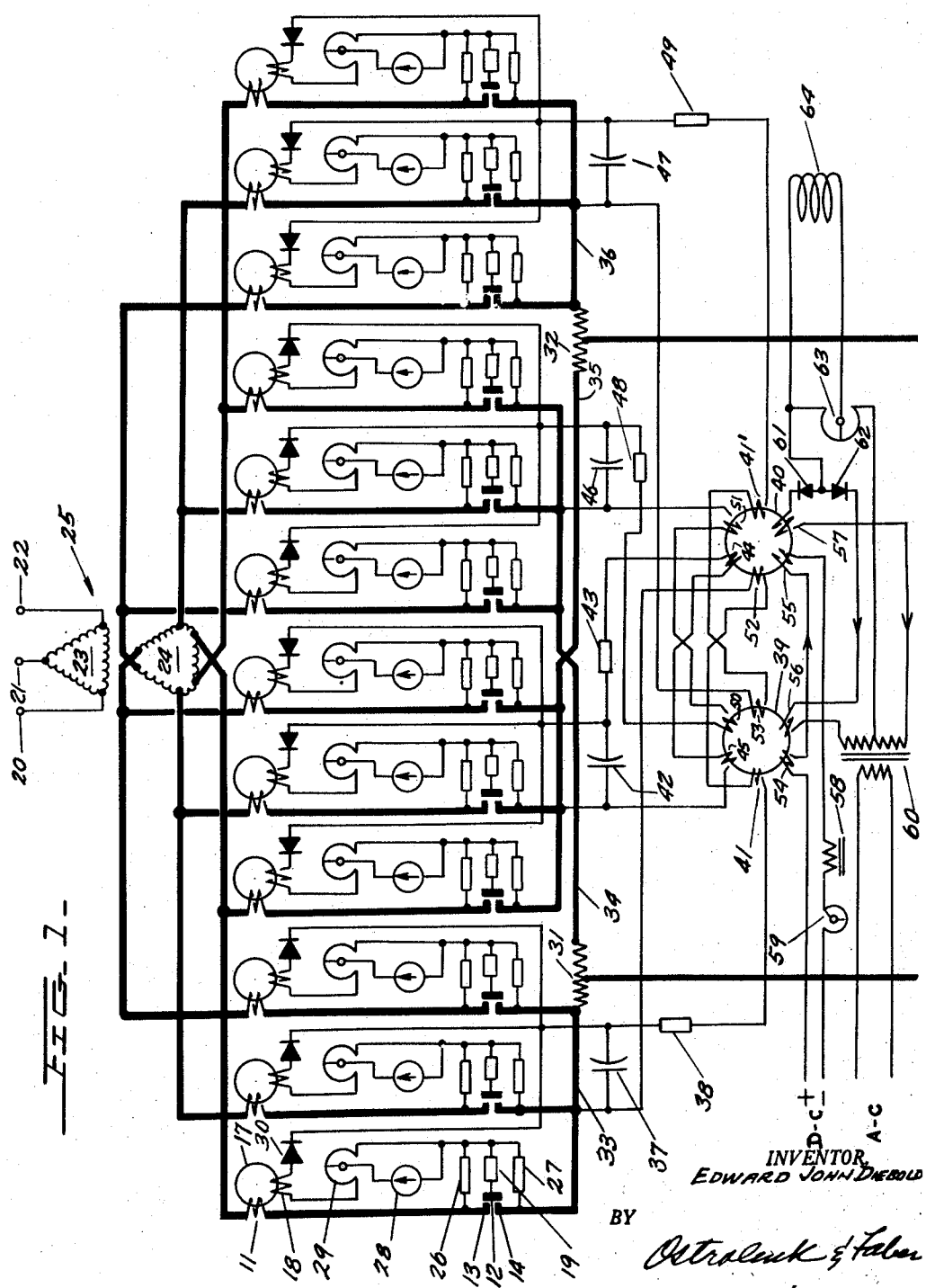
INVENTOR
EDWARD JOHN DIEBOLD
BY
*Ostrolenk & Faber*
ATTORNEYS

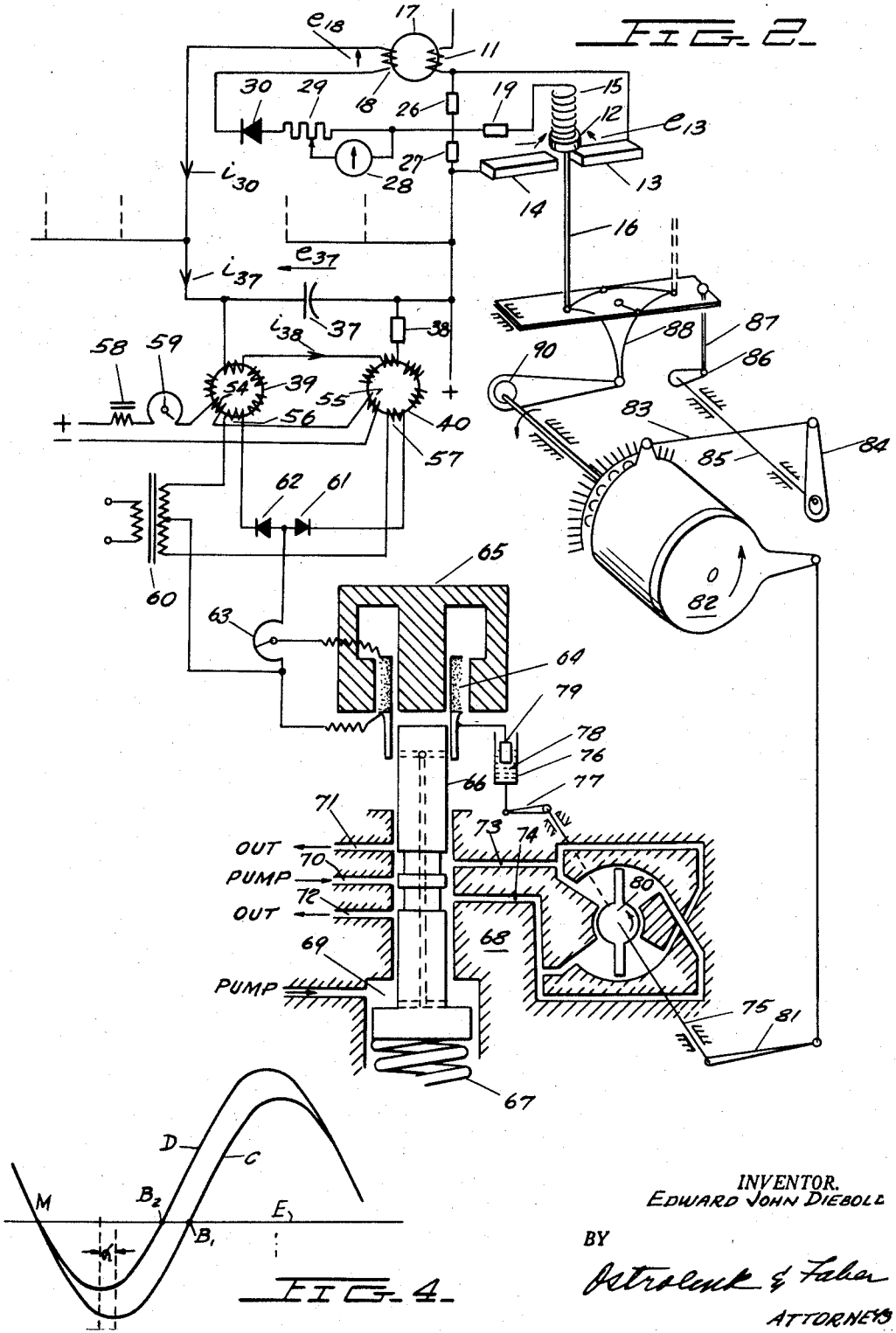

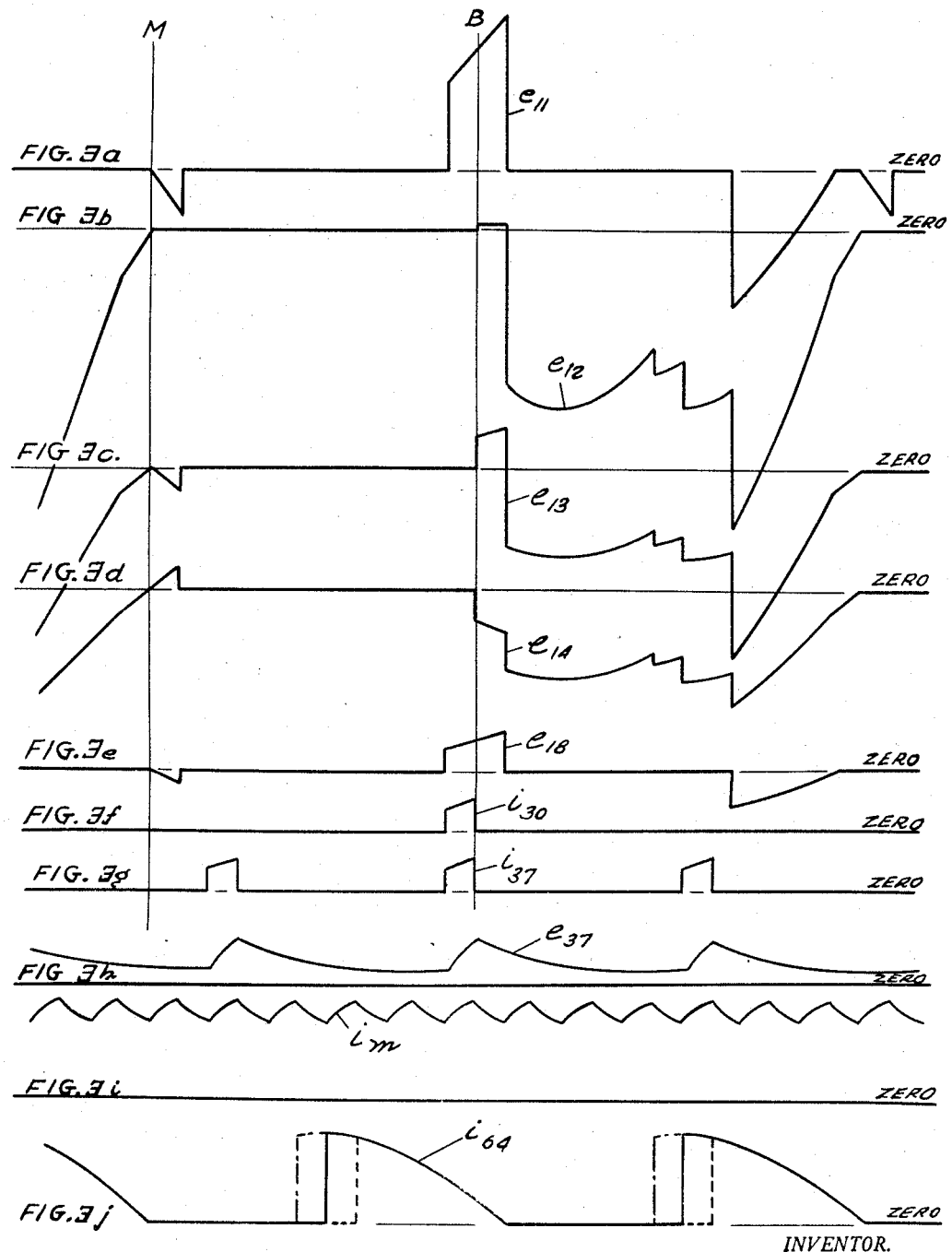

United States Patent Office 2,905,883
Patented Sept. 22, 1959

2,905,883

AUTOMATIC OVERLAP CONTROL FOR MECHANICAL RECTIFIERS

Edward John Diebold, Ardmore, Pa., assignor to I-T-E Circuit Breaker Company, Philadelphia, Pa., a corporation of Pennsylvania Application March 15, 1955, Serial No. 494,496

15 Claims. (Cl. 321—48)

My invention relates to an overlap circuit and regulator for mechanical rectifiers and more specifically to an overlap circuit and regulator which can be applied to mechanical rectifiers utilizing magnetic voltage control.

Mechanical rectifiers of this type are clearly described in copending application Serial No. 423,358 filed April 15, 1954 and assigned to the assignee of the present invention, now Patent No. 2,817,805, which describes a flux reversal circuit for mechanical rectifiers. Previously used overlap regulators and overlap regulating circuits are shown in connection with mechanical rectifiers in which regulation is achieved by delaying the point at which commutation takes place by mechanically shifting the stator of the synchronous motor so that the contacts will close at a later point. Devices of this type are clearly shown in copending application Serial No. 331,467 filed January 15, 1953, now Patent No. 2,759,141.

As is well known in the art, a mechanical rectifier produces D.C. current by making metallic contact between the proper phase of an A.C. system and an associated D.C. system during the time interval the particular A.C. phase is capable of delivering energy in the desired direction, then breaking the metallic contact when the A.C. phase reverses its potential in relation to the D.C. voltage.

Mechanically, the rectifier is a motor driven switch connecting the A.C. voltage to the load at such a time, repeatedly, and in synchronism with the A.C. frequency current that flows continuously in one direction.

Mechanical rectifiers are the most efficient rectifiers known today since they present a resistance of the order of magnitude of a few milliohms in the desired direction and infinite resistance in the opposite direction.

The making and breaking operation in these rectifiers must occur when the value of the currents at the time of making and of breaking is equal to zero so that the contacts are not in any way damaged. This problem was successfully overcome by the use of the commutating reactor in mechanical rectifiers.

It was observed, in fact, that when a reactor of the saturable type was introduced in an A.C. system, sufficient zero current time was provided for sparkless contact operation. This zero current time, commonly known as step, must be provided at the beginning and end of the conductive interval and the length of this step is the period of time required for the core of the reactor to become magnetically saturated.

It is well known, in fact, that a commutating reactor will present practically infinite reactance when unsaturated and practically zero reactance when saturated. When a current flowing in a circuit provided with the commutating reactor approaches the zero point, it will unsaturate the commutating reactor. The now unsaturated commutating reactor presents such a high reactance that the current flowing through the circuit remains at zero. It is during this time, as previously mentioned, that the making and breaking operation of the contact is performed.

To summarize the above, the effect of the commutating reactor is to restrain current flow while magnetization is making a complete reversal in either direction and to permit full current flow the instant the core is saturated.

In a three-phase mechanical rectifier, the making operation of a second phase occurs before the breaking operation of the first phase to assure proper commutation. The time length in which both contacts are closed, in other words, the time interval between the time when the contact of the second phase is made and the time when the contact of the first phase is broken, is called overlap. For ideal commutation, the break of the first phase must occur in the middle of a step.

The D.C. output of the mechanical rectifier can be changed by increasing the length of the make step, thereby delaying the point at which commutation takes place. This allows the advantage of making the contact at zero voltage under all conditions of regulation and can be accomplished by means of the previously mentioned flux reversal circuit shown in copending application Serial No. 423,358.

It is clear that the greater the make step the smaller will be the average A.C. voltage transferred to the D.C. side and therefore the lower the resultant D.C. voltage. However, it is now obvious that an overlap control shaft or contact time shaft regulator is needed. By this means, when the make step has been adjusted for high or low voltage, the contact overlap must be made shorter or longer respectively. For this adjustment, the overlap control shaft is raised or lowered with respect to the stationary contact. The change of distance raises or lowers the mean level of the travel of the moving contacts and shortens or lengthens the time the contacts remain closed.

The overlap time will vary depending on many parameters such as the length of the make step, the load current, primary voltage variations, fluctuation in the A.C. frequency, and many others.

Therefore, the function of the overlap regulator of my invention is to maintain the point of contact break in the middle of the break step under all conditions.

I first provide a measuring circuit in each phase and which is made responsive to the point of contact break within the break step of the commutating reactors. A similar type circuit has been shown in previously mentioned copending application Serial No. 331,467 where the output of the circuit was taken directly from the contact and commutating reactor and applied directly to a regulating means such as a hydraulic regulator. In my novel measuring circuit, I apply the output of each measuring circuit not directly to a regulator such as a hydraulic regulator which requires a certain amount of power, but to the control winding of a magnetic amplifier and the regulator is controlled by the load winding of said magnetic amplifier.

It should be noted that the use of an amplifier such as a magnetic amplifier to transfer power from the measuring circuit to a hydraulic regulator can also be applied in rectifiers wherein regulation is achieved by mechanically delaying the point of contact make.

The novel use of an amplifier which can be a magnetic amplifier in this application has several desirable features:

(1) The amount of power available to drive the overlap regulator can be greatly increased.

(2) Since the amount of power which must be taken from the contact itself is reduced considerably, there is now little or no damage done to the contact because of the overlap circuit power drain.

(3) The overlap measuring circuit is rendered independent of the overlap regulating circuit. That is, feed back of current from the output to the input of the electrical part of the overlap regulator is now prevented.

(4) All contacts of a large multiphase mechanical rectifier can now be used to control the amplifier of the rectifier since the signal from each phase can be isolated on a separate winding of the magnetic amplifier. By this, I obtain a regulator which regulates the overlap according to the average overlap of all contacts and which is not affected by the individual differences of the contact times.

(5) The use of a magnetic amplifier is easily adapted to provide an easy and dependable means for adjusting the point at which the overlap control of the rectifier should operate.

(6) Since each phase of my invention can contain an individual overlap measuring circuit, a meter can now be placed within each individual circuit to continuously monitor the contact time of that phase.

(7) In some rectifier connections, as will be shown hereinafter, similar output terminals can be at different potentials and the application of measuring circuits in each individual phase feeding into a common energy sink will create short circuits. However, by using a magnetic amplifier as above mentioned, I can apply the signal of each phase to an individual control winding on the magnetic amplifier, thereby isolating the individual potentials without short circuit problems and still have a total control signal which is a true average of the overlap time of each phase.

Accordingly, a primary object of my invention is the use of a magnetic amplifier which is controlled by an overlap measuring circuit to energize an overlap regulator.

Another object of my invention is to provide an overlap measuring circuit in which each phase of a mechanical rectifier contributes a portion of the measurement. For instance, in a mechanical rectifier having twelve phases, the total signal generated by the overlap measuring circuit would be the average of the contact time over all twelve contacts to thereby give very smooth and steady operation.

Still another object of my invention is to reduce the amount of power taken from the contacts by the overlap measuring circuit.

A further object of my invention is to provide an individual overlap measuring circuit for each phase of a mechanical rectifier in which a meter can be placed to continuously monitor the contact time of each phase.

A still further object of my invention is to provide a magnetic amplifier in which the load winding controls the operation of an overlap regulator and the control windings are energized as a function of the average point within the break step at which the contacts break for each phase irregardless of the relative potential of each phase.

A still further object of my invention is to adjust the break point of the mechanical rectifier contacts according to a measured value which is an average of all the contacts, this measured value being obtained from the mechanical rectifier without damaging the contacts, and without endangering the operation itself and this average being a true average of all the contact times of all the contacts.

The output measuring circuit more particularly draws power from the commutating reactor and contact and delivers this power to some output such as the control winding of a magnetic amplifier as shown above, when the contact is closed and the commutating reactor is unsaturated. Until now, the design of the overlap control measuring circuit as shown in copending application Serial No. 331,467 was made so that there would be no voltage between one stationary contact and the movable contact and the full inverse line voltage would appear between the other stationary contact and the movable contact. If then a small speck of silver dust or other impurity appears between the contacts having a voltage across them, an arc would occur which will always lead to a back fire.

I now propose the use of a resistor voltage divider which will hold the voltage across the movable contacts to either of the stationary contacts to an equal amount and the same polarity. Furthermore, the value of these resistors will be so high that the current which they pass is insignificant. It should be noted that this novel resistor voltage divider can be applied in an overlap measuring circuit used in mechanical rectifiers wherein voltage regulation is obtained by varying the point of contact engagement as well as in mechanical rectifiers which utilize magnetic voltage control.

Accordingly, another object of my invention is to provide a resistor voltage divider which comprises a high resistor connected from each stationary contact to the movable contact which will hold the voltage across the contacts equal and at the same polarity.

We now have a circuit which measures the overlap time of each individual phase, impresses this signal upon the control winding of a magnetic amplifier, and the load winding of the magnetic amplifier will in turn control the operation of an overlap regulator which can be a hydraulic type device.

The problem of going from the hydraulic regulator to the overlap shaft is now a very different one from the problem faced in overlap regulators used in mechanical rectifiers wherein regulation is obtained by varying the point of contact make. Rather, the problem in mechanical rectifiers utilizing magnetic voltage control is unique in that the contact make point must remain constant and only the contact break point must vary in accordance with the measured value of the overlap time.

To overcome this problem, I provide a novel linkage from the overlap regulator which works in a manner such that the change in the make point due to a change in the contact time is compensated by an appropriate and automatic change in the stator angle of the synchronous motor which drives the contacts.

Therefore, a linkage is provided in which the contact time, hence the break point as well as the make, is varied in accordance with the measured overlap time and a second link automatically varies the stator angle to maintain the point of contact engagement constant.

Accordingly, it is another object of my invention to provide a linkage from the overlap regulator which in effect will separate the make and the break points in such a way that the make point will always remain constant and only the break point will vary in accordance with the measured overlap time.

Still another object of my invention is to provide an overlap regulator which permits contact engagement at zero voltage under all conditions and still allows a free adjustment of the point of contact disengagement.

These and other objects of my invention will become apparent from the following description when taken in connection with the figures in which:

Figure 1 shows a complete overlap control circuit for a mechanical rectifier having twelve contacts.

Figure 2 shows a schematic diagram of the overlap control circuit of Figure 1 for only one contact in conjunction with a hydraulic regulator and a linkage going from the hydraulic regulator to the contact.

Figure 3a shows the voltage time characteristics of a commutating reactor main winding of Figure 1.

Figure 3b shows the voltage across the stationary contacts of Figure 1 as a function of time.

Figure 3c shows the voltage from one stationary contact to the movable contact of Figure 1 as a function of time.

Figure 3d shows the voltage from the second stationary contact to the movable contact of Figure 1 as a function of time.

Figure 3e shows the voltage appearing across an auxiliary winding of the reactor of Figure 1 which is in the overlap measuring circuit plotted as a function of time.

Figure 3f shows the current in one overlap measuring circuit of Figure 1 plotted against time.

Figure 3g shows the total current collected from three individual overlap measuring circuits and impressed upon one control winding of a magnetic amplifier as a function of time.

Figure 3h shows the total voltage appearing across the control winding in which the current shown in Figure 3g flows as a function of time.

Figure 3i shows the total control magneto-motive force impressed upon the magnetic amplifier control windings from each of the twelve overlap control measuring circuits shown in Figure 1 as a function of time.

Figure 3j shows the magnetic amplifier output current to the regulator of Figures 1 and 2 as a function of time.

Figure 4 shows the travel-time relationship at the push rod 16 and the contact 12 for two different conditions.

Mechanical rectifier

Referring now to Figures 1 and 2, the mechanical rectifier circuit is fed by the A.C. power terminals 20, 21 and 22. The power flows into the transformer 25 which has a primary 23 and a secondary 24 which is connected in deltapolygon. The six secondary terminals of the power transformer 25 are each connected to two communicating reactors which have a winding 11 and a core 17. Each commutating reactor is connected to one contact such as fixed contact 13, movable contact 12 and fixed contact 14. From the contacts, the D.C. terminals are connected to the interphase transformers 31 and 32. Transformer 31 connects the two positive leads of the rectifier and transformer 32 connects the two negative leads of the rectifier. Three contacts always feed into a positive or a negative terminal.

The three first contacts, counting from the left in Figure 1, form together a complete three-phase rectification system; the same is true for the three following contacts and the seventh and eighth and ninth contacts which also form together a positive lead and a complete rectifying system. The two positive leads formed by the first, second and third, and by the seventh, eighth and ninth contacts, are at a different potential, which is given by the sixth harmonic of the A.C. wave which is rectified in the D.C. side. The bus bars, therefore, are at different potentials, since there is a sixth harmonic voltage between bars 33 and 34, and the same harmonic voltage exists between bars 35 and 36. Besides these harmonic voltages, there is also the substantial D.C. voltage between the bus bars 33, 34, and bus bars 35, 36. The overlap control circuit is connected to these bus bars, and somehow a means had to be found to add all these overlap control voltages, without short-circuiting the different power voltages between the four bus bars 33, 34, 35 and 36.

To achieve rectification, the contact 12 which can be of the type shown in application Serial No. 307,067, filed August 29, 1952 and assigned to the assignee of the present invention, now Patent No. 2,798,909, is moved by a push rod 16 shown in Figure 2. It is compressed against the contacts 13 and 14 by a spring 15. The push rod motion is in synchronism with the A.C. frequency and the contacts will engage and disengage at this frequency.

It should be noted that this particular rectifier connection has been chosen only to hereinafter illustrate the novel use of a magnetic amplifier to receive the overlap time signal from each phase even though the potentials of the phases may have widely different values. However, the use of the magnetic amplifier to be described in the following, can be applied to all mechanical rectifier circuits of this type.

The overlap regulator measuring circuit

In Figure 1, the overlap circuit is shown as the connection of movable contact 12 (through the spring 15 which is not shown), resistor 19, to a circuit comprising milliamperemeter 28, rheostat 29, auxiliary winding of the commutating reactor 18 and a rectifier 30 which can be of the selenium type. Contact 12 is then connected to the capacitor 37, which leads again back to the fixed contact 14. Therefore the overlap measuring circuit comprises a closed circuit in which the auxiliary winding on the commutating reactor core 17 induces a voltage every time the commutating reactor core 17 is unsaturated.

In conjunction with these components, I show my novel voltage divider comprising resistors 26 and 27 which permits balance of the voltage across the contact.

The above described measuring circuit works in conjunction with the mechanical rectifier circuit as follows: A voltage shown as $e_{11}$ in Fig. 3a appears on winding 11 during normal operation and induces the voltage $e_{18}$ of Figure 3e in auxiliary winding 18. This voltage appears in the closed loop formed by the components attached to the capacitor 37 and charges the capacitor 37 with a small current pulse once each cycle. If the voltage across the winding 18 is negative, no negative current can flow, because the selenium rectifier 30 prevents current flowing into the negative direction. This eliminates the two triangular voltage dips appearing below the zero line in Figure 3e. On the other hand, when the contact 12 is open or more specifically when the gap between the contacts 12 and 14 is open, no current can flow in this closed circuit because it is interrupted at this point (the resistor 27 has such a high resistance that it carries only a negligible current). For this reason, the current in this circuit is interrupted exactly at the point B in Figure 3. The current, therefore, flowing in the circuit containing the selenium rectifier 30 is shown as $i_{30}$ in Figure 3f.

This current is a short pulse, occurring only between the beginning of the break step of contact 12 and the actual break itself. The current cannot flow after the actual break because the circuit is open. It cannot flow during the make step or flux reversal because the selenium rectifier 30 itself blocks, and it cannot flow during any other part of the cycle because there is no voltage appearing on the circuit.

The current $i_{37}$ which charges the capacitor 37 is shown in Figure 3g. This charging current consists of three pulses per cycle, all three pulses being generated each by a voltage across a commutating reactor winding 18 and cut off by the corresponding contact 12 being opened. The three pulses, therefore, can be of different shape and length, the magnitude being given by the voltage across the commutating reactor winding 18 which is the voltage in the system during the commutation, and the length being determined by the time when the contact 12 opens. These current pulses are averaged in the capacitor 37, which charges and discharges itself in a saw-tooth voltage-wave shown as $e_{37}$ in Figure 3h.

Voltage $e_{37}$ causes a current $i_{38}$ to flow in the resistor 38. Current $i_{38}$ has the same shape as the voltage $e_{37}$ and is shown in Figure 3h. This current $i_{38}$ magnetizes the magnetic cores 39 and 40 of the magnetic amplifier with a magnetization current which has the shape of a saw-tooth wave.

Figure 3b shows the voltage $e_{12}$ across the contacts 13 and 14. This voltage is zero in the time interval M to B because the contact is closed. The voltage is almost zero and slightly positive during the end of the break step, and then becomes high and negative. Figure 3c shows the voltage $e_{13}$ between the contact 12 and the contact 13. Note that this voltage also appears across the resistor 26. Figure 3d shows the voltage $e_{14}$ between the fixed contact 14 and the movable contact 12, and this voltage also appears across the resistor 27.

The voltages appearing in Figure 3c and Figure 3d are with small exceptions the same voltages as the one appearing in Figure 3b except that these voltages are only half as high. The difference between them is that the commutating reactor winding 18 induces a small voltage into the closed overlap measuring circuit between the contacts 12, spring 15, resistor 19, meter 28, resistor 29, selenium rectifier 30, winding 18, capacitor 37 and back to contact 14.

Voltage $e_{18}$ shown in Figure 3e which is induced in winding 18 adds to the voltage of the gap between contact 14 and contact 12 and subtracts in the gap between contact 12 and contact 13. This additional voltage increases the voltage immediately after the make step in Figure 3d and decreases the voltage in Figure 3c. Inversely, it increases the voltage immediately after the break in Figure 3c and decreases it the same amount in Figure 3d. The same thing happens approximately a half-cycle later when the large triangular flux reversal voltage appears.

It is now apparent that the voltage between contacts 12, 13 or 12, 14 will be held at approximately the same amount by the novel resistor voltage-divider comprising the resistors 26 and 27. They will equally divide the voltage across the contact, except when the winding 18 induces the additional voltage $e_{18}$ which causes the voltage drop shown in Figure 3e.

*Magnetic amplifier*

Returning now to Figure 1, it is seen that the capacitor 37 energizes the coils 41 and 52 on the cores 39 and 40 through the resistor 38. The same is true of capacitor 42 which discharges itself through the resistor 43 into the coils 44 and 45. Similarly, capacitors 46 and 47 discharge through the resistors 48 and 49 to magnetize coils 50, 51, 41' and 53. The cores 39 and 40, therefore, are subjected to four-fold saw-tooth magnetization which adds up to the wave shown as $i_m$ in Figure 3i. Therefore, the total magnetomotive force on these two cores 39 and 40 is obtained by four independent coils 41, 41', 44, 45 and 50, 51, 52, 53 respectively which are electrically isolated from each other.

The actual currents are of the magnitude of one milliampere and the actual voltage drops in those windings are in the order of millivolts only. This means, therefore, presents the possibility of adding a very small current at a very small voltage together to have a common effect in the magnetic amplifier, although the different currents stem from very different potentials and could not be connected together by wires, without immediately causing a very large short circuit current.

Cores 39 and 40 also contain bias windings 54 and 55 and main windings 56 and 57. Bias windings 54 and 55 are fed from a D.C. source over a choke 58 and a rheostat 59. This bias permits adjustment of the point of operation of the magnetic amplifier. The magnetic amplifier itself is energized from transformer 60 which has a center tapped secondary. The tapped secondary of transformer 60 are connected to magnetic amplifier windings 56 and 57 which in turn are connected to rectifiers 61 and 62. The output of the magnetic amplifier is then connected across the potentiometer 63 which is in turn connected to regulator coil 64.

Coil 64 is contained in a permanent magnet 65 as shown in Figure 2 which creates a magnetic flux across this coil. The output current of the magnetic amplifier flowing in the coil 64 is shown as $i_{64}$ in the Figure 3j. This current is given by the output of the magnetic amplifier and is, as was above mentioned, a single-phase full-wave rectified current, delayed by the amount of phase control afforded with the coils 56 and 57. This output is roughly proportional to the input magnetomotive force $i_m$ shown in Figure 3i which in turn is actually the sum of the action of four coils which in turn again contain three current pulses. That is, the current through the coil 64 is the sum of the currents provided by all the commutating reactor windings 18 as they are chopped off by the opening of the contacts 12.

*Overlap regulator*

Referring particularly to Figure 2, and the regulator shown therein, by suitable adjustment of the rheostat 59 the coil 64 will float in the magnet 65, since its magnetic force will be equal to its weight. This occurs at the desired contact timing of the contacts 12. The rheostat 63 permits adjustment of the magnetic amplifier output to be, at the floating point, exactly one half of the maximum obtainable output.

When the magnetic amplifier is working at its optimum rating, the coil 64 obstructs partly the holes of the shaft 66 which floats on a spring 67. In an actual regulator, shaft 66 rotates to reduce the friction between it and the body of the regulator.

The body of the regulator is shown in Figure 2 as a shaded bushing 68. When the coil 64 moves up, the ports in the shaft 66 are uncovered and the pump pressure in the cylinder 69 decreases. This provides the spring 67 with a force-unbalance which lifts the shaft 66. By this means the shaft always follows the lower edge of the coil body in such a way that the holes in the shaft are always half way uncovered.

The shaft 66 has two valve openings and a central piston which obstructs the pump opening 70. The outputs 71 and 72 also are obstructed, whereas the holes towards the operating vanes 73 and 74 are open. If the current in the contacts (as an average) is too high, this current increases the current $i_m$ of Figure 3i flowing through the control windings of the magnetic amplifier, which in turn increases the output current of the magnetic amplifier, shown as a dot-dash line in Figure 3j, which then lifts up the coil 64, which permits the spring 67 to lift the shaft 66, which uncovers the valve and lets the pump's pressure from the hole 70 flow into the hole 74 and connects the hole 73 to the outlet 71. The shaft 75 then rotates in a counterclockwise direction as shown by the arrow on the vane 80.

Shaft 66 also moves the cylinder 76 by means of the arm 77, which pushes the coil 64 down through the dashpot 78 and the piston 79. This dashpot feed-back is introduced to prevent the regulator from hunting. When the vane and therefore the shaft 75 moves in the counterclockwise direction, the arm 81 moves up.

*Linkage from regulator to contact structure*

When arm 81 turns the synchronous motor stator 82 of the mechanical rectifier in the counterclockwise direction, the contact closing time of all the contacts will be advanced. At the same time, the stator 82 of the motor moves, by means of the rod 83, the lever arm 84 of the overlap control shaft 85 of the mechanical rectifier, which by the eccentric 86 and the rod 87 lifts the rocker arms 88 of all the contacts. This means that for the same motion of the push rod 16, the contact times are shorter. Since the contact times are shorter, but all contacts are closing earlier, the closing actually occurs at the same time, and only the opening of the contact occurs earlier. If the opening of the contact occurs earlier, the point B is moved towards the left and the area enclosed by the current $i_{30}$ in Figure 3f is smaller. This area, being smaller, reduces the voltage $e_{37}$ across the capacitor, which in turn reduces the sum of currents $i_m$ magnetizing the magnetic amplifier which reduces the output of the regulator. By this means, therefore, we obtain automatically that the output current $i_{64}$ of the magnetic amplifier always follows the solid line in Figure 3j and is moving the synchronous motor always in such a direction as to have either a shorter or longer contact time to obtain this ideal output.

The effect of the overlap control afforded with the synchronous motor and the overlap shaft of the mechanism as shown in Figure 2 is shown as an example in Figure 4. In this figure the curves C and D show the movements of the push rod 16 as a function of time for two different contact times. Assuming at the adjustment C the contact time to be too long, the make which should always occur at the point M which is on the line E which is (with respect to the movement of the push rod) the level at which the contact 12 closes. The contact 12, therefore, closes at the point M and is lifted off again at the time $B_1$. To reduce the contact time, but to keep the make point M at the same time, the sine wave has to be shifted up from the curve C to the curve D and at the same time has to be shifted back by the angle $\alpha$.

This is obtained with the novel linkage between the synchronous motor stator 82, the link 83, the arm 84, and the shaft 85. Choosing the right amount of the link length for links 82, 84 and 86, we can obtain easily an adjustment which only changes the break point of all the contacts and leaves all the make points the same. Since the eccentricity of the mechanical rectifier eccentric 90 is well known, and all other lever arms can be exactly calculated, this adjustment to be done automatically by means of the regulator vane 80 is always correct.

Although I have described a preferred embodiment of my novel invention, it will now be apparent that many modifications and variations may be made by those skilled in the art. I therefore prefer to be limited not by the specific disclosure herein, but only by the appended claims.

I claim:

1. In a circuit to control the overlap regulator of a multiphase mechanical rectifier, means to provide a signal responsive to the point of contact break within the break step of each phase, a magnetic amplifier; said magnetic amplifier connected to energize said overlap regulator; the average value of said signals responsive to the point of contact break within the break step of each phase impressed upon said amplifier and said overlap regulator energized in response to the average of said impressed signals, said overlap regulator operatively connected to vary the point of contact break.

2. In a circuit to control the overlap regulator of a multiphase mechanical rectifier, means to provide a signal responsive to the point of contact break within the break step of each phase and a magnetic amplifier; said magnetic amplifier connected to energize said overlap regulator; said signals responsive to the point of contact break within the break step of each phase impressed upon individual control windings of said magnetic amplifier and said overlap regulator energized in response to the average value of said impressed signals, said overlap regulator operatively connected to vary the point of contact break.

3. In a multiphase mechanical rectifier utilizing magnetic voltage control, means to provide a signal responsive to the point of contact break within the break step of each phase and a regulator; said regulator operatively connected to vary said point of contact break of each phase; a magnetic amplifier to energize said regulator and having each of said signals responsive to said point of contact break impressed on individual control windings to provide a control signal which is the average of all of said signals to said magnetic amplifier; said regulator and magnetic amplifier constructed to maintain said point of contact break at an adjustable predetermined point within the break step.

4. In a circuit to control the overlap regulator of a multiphase mechanical rectifier, means to provide a signal responsive to the point of contact break within the break step of each phase and a magnetic amplifier; said magnetic amplifier connected to energize said overlap regulator; the average value of said signals responsive to the point of contact break within the break step of each phase impressed upon said magnetic amplifier and said overlap regulator energized in response to the average of said impressed signals regardless of the relative potential of said signals.

5. An overlap measuring circuit for each phase of a multiphase mechanical rectifier; each of said phase including a commutating reactor and main contacts; said measuring circuit comprising a series connection of a winding on said commutating reactor, a diode connected to conduct current when said commutating reactor is in its break step, a variable impedance, a movable contact and a fixed contact of said mechanical rectifier main contacts; and means to combine the signal appearing at either end of each of said series connections; said combined signal to be the average of each individual overlap measuring circuit signal; a magnetic amplifier; said means for combining signals comprising individual control windings of said magnetic amplifier.

6. An overlap measuring circuit for each phase of a multiphase mechanical rectifier; each of said phase including a commutating reactor and main contacts; said measuring circuit comprising a series connection of a winding on said commutating reactor, a diode connected to conduct current when said commutating reactor is in its break step, a variable impedance, a movable contact and a fixed contact of said mechanical rectifier main contacts; and a meter in series with each of said overlap measuring circuits to monitor the contact time of each individual phase.

7. An overlap measuring circuit for each phase to a multiphase mechanical rectifier; each of said phase including a commutating reactor and main contacts; said measuring circuit comprising a series connection of a winding on said commutating reactor, a diode connected to conduct current when said commutating reactor is in its break step, a variable impedance, a movable contact and a fixed contact of said mechanical rectifier main contacts; and means to combine the signal appearing at either end of each of said series connections; said combined signal to be the average of each individual overlap measuring circuit signal; a magnetic amplifier; said means for combining signals comprising individual control windings of said magnetic amplifier; and a meter in series with each of said overlap measuring circuits to monitor the contact time of each individual phase.

8. An overlap measuring circuit for each phase of a multiphase mechanical rectifier; each of said phase including a commutating reactor and main contacts; said measuring circuit comprising a series connection of a winding on said commutating reactor; a diode connected to conduct current when said commutating reactor is in its break step, a variable impedance, a movable contact and a fixed contact of said mechanical rectifier main contacts; and means to combine the signal appearing at either end of each of said series connections; said combined signal to be the average of each individual overlap measuring circuit signal; a magnetic amplifier; said means for combining signals comprising individual control windings of said magnetic amplifier; said magnetic amplifier constructed to energize a regulator responsive to the average point of contact break as measured by said overlap measuring circuits.

9. An overlap measuring circuit for each phase of a multiphase mechanical rectifier; each of said phase including a commutating reactor and main contacts; said measuring circuit comprising a series connection of a winding on said commutating reactor, a diode connected to conduct current when said commutating reactor is in its break step, a variable impedance, a movable contact and a fixed contact of said mechanical rectifier main contacts; and means to combine the signal appearing at either end of each of said series connections; said combined signal to be the average of each individual overlap measuring circuit signal; a magnetic amplifier; said means for combining signals comprising individual control windings of said magnetic amplifier; and a meter in series with each of said overlap measuring circuits to monitor the contact time of each individual phase; said magnetic amplifier constructed to energize a regulator responsive to the average point of contact break as measured by said overlap measuring circuits.

10. In a multiphase mechanical rectifier utilizing magnetic voltage control, means to provide a signal responsive to the point of contact break within the break step of each phase and a regulator; said regulator operatively connected to vary said point of contact break of each phase; a magnetic amplifier to energize said regulator and having each of said signals responsive to said point of contact break impressed on individual control windings to provide a control signal which is the average of all of said signals to said magnetic amplifier; said regulator and magnetic amplifier constructed to maintain said point of contact break at an adjustable predetermined point within the break step; said means to provide a signal responsive to the point of contact break within the break step of each phase comprising the output of a series connection of a winding on the commutating reactor, a diode connected to conduct current when said commutating reactor is in its break step, a variable impedance, a movable contact and a fixed contact of said mechanical rectifier main contacts.

11. In a multiphase mechanical rectifier utilizing magnetic voltage control, each phase of said mechanical rectifier comprising a commutating reactor and main contacts; means to provide a signal responsive to the point of contact break within the break step of each phase and a regulator; said regulator operatively connected to vary said point of contact break of each phase; a magnetic amplifier to energize said regulator and having each of said signals responsive to said point of contact break impressed on individual control windings to provide a control signal which is the average of all of said signals to said magnetic amplifier; said regulator and magnetic amplifier constructed to maintain said point of contact break at an adjustable predetermined point within the break step, said means to provide a signal responsive to the point of contact break within the break step of each phase comprising the output of a series connection of a winding on said commutating reactor of the respective phase, a diode connected to conduct current when said commutating reactor of the respective phase is in its break step, a variable impedance, a movable contact and a fixed contact of said mechanical rectifier main contacts of the respective phase, and a meter in series with each of said overlap measuring circuits to monitor the contact time of each individual phase.

12. An overlap measuring circuit for each phase of a multiphase mechanical rectifier; each of said phase including a commutating reactor and main contacts; said measuring circuit comprising a series connection of a winding on said commutating reactor, a diode connected to conduct current when said commutating reactor is in its break step, a variable impedance, a movable contact and a fixed contact of said mechanical rectifier main contacts; and means to combine the signal appearing at either end of each of said series connections; said combined signal to be the average of each individual overlap measuring circuit signal; a magnetic amplifier; said means for combining signals comprising individual control windings of said magnetic amplifier; said magnetic amplifier constructed to energize a regulator responsive to the average point of contact break as measured by said overlap measuring circuits; and a compensation circuit to equalize the voltages across either of the fixed contacts and said movable contacts of the main mechanical rectifier contact and comprising the connection of a relatively high resistance from each of said fixed contacts to said movable contact.

13. In a multiphase mechanical rectifier utilizing magnetic voltage control, each phase of said mechanical rectifier comprising a commutating reactor and main contacts; means to provide a signal responsive to the point of contact break within the break step of each phase and a regulator; said regulator operatively connected to vary said point of contact break of each phase; a magnetic amplifier to energize said regulator and having each of said signals responsive to said point of contact break impressed on individual control windings to provide a control signal which is the average of all of said signals to said magnetic amplifier; said regulator and magnetic amplifier constructed to maintain said point of contact break at an adjustable predetermined point within the break step, said means to provide a signal responsive to the point of contact break within the break step of each phase comprising the output of a series connection of a winding on said commutating reactor of the respective phase, a diode connected to conduct current when said commutating reactor of the respective phase is in its break step, a variable impedance, a movable contact and a fixed contact of said mechanical rectifier main contacts of the respective phase, and a meter in series with each of said overlap measuring circuits to monitor the contact time of each individual phase, and a compensation circuit to equalize the voltages across either of the fixed contacts and said movable contact of the main mechanical rectifier contact and comprising the connection of a relatively high resistance from each of said fixed contacts to said movable contact.

14. In an overlap measuring circuit for a mechanical rectifier; said mechanical rectifier comprising a series connected commutating reactor and main contacts; said main contacts comprising a pair of fixed stationary contacts and a movable bridging contact; said measuring circuit comprising the series connection of a winding on said commutating reactor, a diode connected to conduct current when said commutating reactor is in its break step, a variable impedance, said movable bridging contact and one of said pair of stationary contacts; and means to equalize the voltage drop from said movable bridging contact to each of said stationary contacts, said equalizing means comprising a relatively high impedance connected from each of said stationary contacts to said movable bridging contacts.

15. In an overlap measuring circuit for a mechanical rectifier; said mechanical rectifier comprising a series connected commutating reactor and main contacts; said main contacts comprising a pair of fixed stationary contacts and a movable bridging contact; said measuring circuit comprising the series connection of a winding on said commutating reactor, a diode connected to conduct current when said commutating reactor is in its break step, a variable impedance, said movable bridging contact and one of said pair of stationary contacts, and a meter to monitor contact time; and means to equalize the voltage drop from said movable bridging contact to each of said stationary contacts, said equalizing means comprising a relatively high impedance connected from each of said stationary contacts to said movable bridging contacts.

References Cited in the file of this patent

UNITED STATES PATENTS

| 608,134 | Lundell | July 26, 1898 |
| 1,824,957 | Wintringham | Sept. 29, 1931 |
| 2,651,750 | Koppelmann | Sept. 8, 1953 |
| 2,697,193 | Schmidt | Dec. 14, 1954 |
| 2,769,951 | Kleinvogel | Nov. 6, 1956 |
| 2,782,359 | Koppelmann | Feb. 19, 1957 |

FOREIGN PATENTS

| 497,533 | Canada | Nov. 10, 1953 |
| 1,073,777 | France | Sept. 29, 1954 |
| 936,276 | Germany | Dec. 7, 1955 |